Figure 1A:
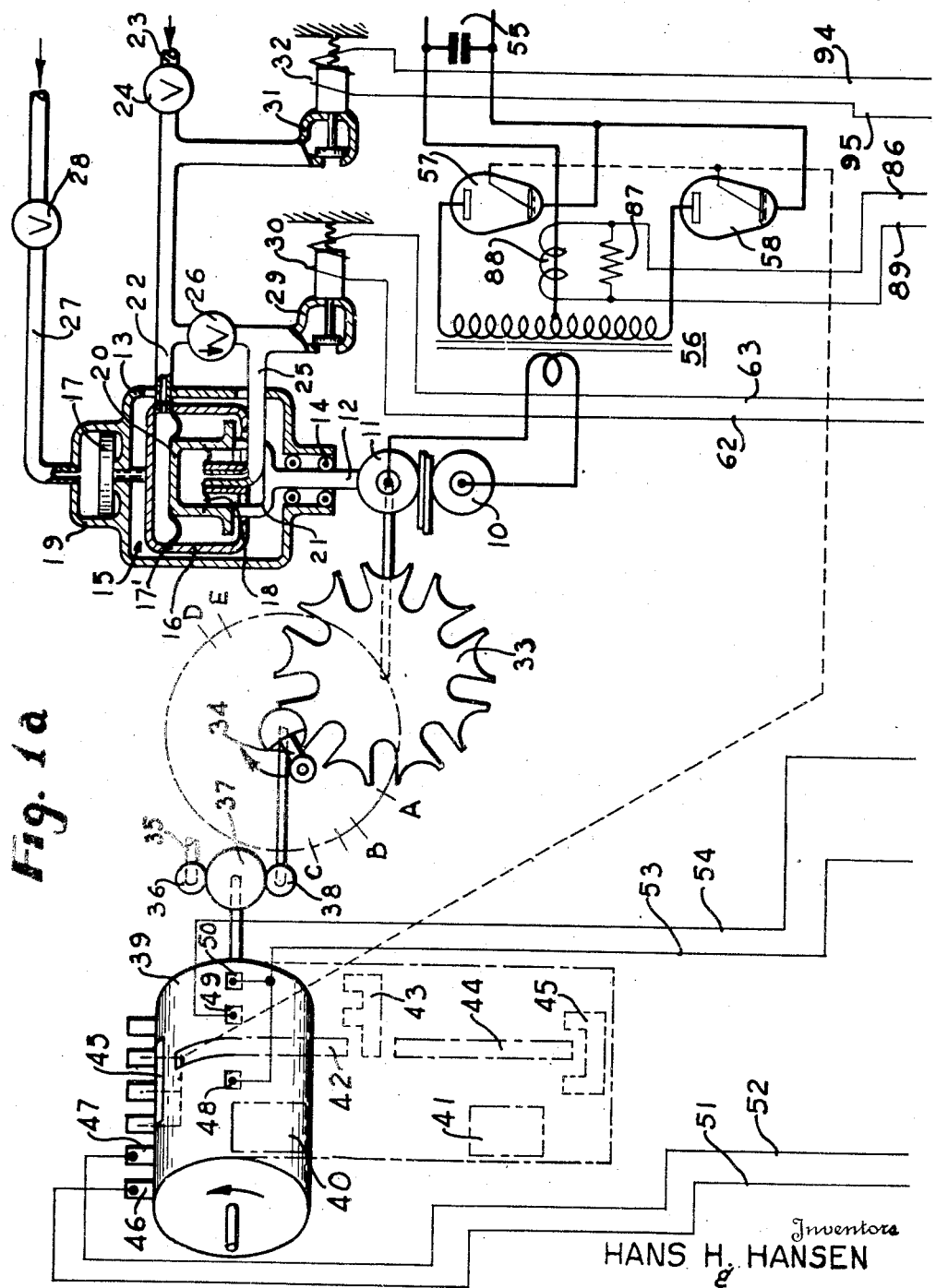

June 24, 1947.  H. H. HANSEN ET AL  2,423,067
WELDING APPARATUS
Filed June 16, 1944  3 Sheets-Sheet 1

Inventors
HANS H. HANSEN
CLYDE E. SMITH
By Francis J. Klempay
Attorney

Inventors
HANS H. HANSEN
CLYDE E. SMITH

Patented June 24, 1947

UNITED STATES PATENT OFFICE 2,423,067

WELDING APPARATUS

Hans H. Hansen and Clyde E. Smith, Warren, Ohio, assignors to The Taylor-Winfield Corporation, Warren, Ohio, a corporation of Ohio Application June 16, 1944, Serial No. 540,692

15 Claims. (Cl. 219—4)

This invention relates to electric resistance welding apparatus and more particularly to improved arrangements and devices for regulating or controlling the force cycles applied to the electrodes of such apparatus. The advantages, in electric resistance spot welding, of increasing the force or pressure exerted between the pieces being welded together by action of the electrodes during the respective welding cycles has been heretofore adequately demonstrated, particularly as regards the production of crack-free welds and the reduction in the quantity of the electrical energy required in the welding process as well as regards the minimizing of deleterious metallurgical effects in the metal of the work pieces caused by heating thereof. Welding systems of this general nature have heretofore been confined, in their application, to spot welding machines in which the electrodes are moved apart after each successive welding operation to permit the work pieces to be shifted or replaced preparatory to the next succeeding welding cycle. The primary object of the present invention is to further the state of the electric resistance welding machine art by providing an operative and practical system wherein the above outlined advantageous mode of operation may be attained in an automatic spot welding machine employing roller electrodes whereby the work pieces may be progressed between the electrodes and welds of consistently high quality may be expeditiously and rapidly made along a line on the work piece.

The operation of welding systems of the above nature, commonly termed "roller spot welding," necessarily requires that the work be at rest with respect to the electrodes during the actual welding cycles for sufficient intervals of time to enable the predetermined welding force and current cycles to be completed, such force and current cycles being preferably variable per se and in correlation as necessitated by the particular nature and thickness of the work being welded. The interim movement or indexing of the work or electrodes between successive welds should occur rapidly and consume but a minor portion of the total cyclic time so that a rapid rate of general welding progression may be attained. Such relative movement between the electrodes and the work may be attained either by driving one or both of the roller electrodes in an intermittent manner as disclosed herein or by one or the other of the methods disclosed and claimed in the co-pending application of Hans H. Hansen Serial No. 516,397 filed December 31, 1943, now Patent Number 2,404,632, dated July 23, 1946. In any mode of operation it is desirable that the force applied to the electrodes be materially reduced or substantially eliminated altogther during the indexing movement to avoid marking of the stock between welds and unnecessary bearing wear in the welding machine. It is accordingly another object of the invention to provide in a welding machine of the roller spot type an operative arrangement whereby the electrode force may be, if desired, substantially eliminated during the indexing movements of the work or electrodes.

A further object of the invention is the provision of a roller spot welding system having the advantageous characteristics enumerated above but which, nevertheless, is operative to time the applications of the higher second welding force during the welding cycles in a minutely adjustable and highly consistent manner.

Yet another object of the invention is the provision of a roller spot welding machine which through the manipulation of a single control element may operate in a widely different manner particularly as regards the welding force cycle whereby the range of usefulness of the machine generally is enhanced.

The above and other objects and advantages of the invention will become apparent upon consideration of the following detailed specification and the accompanying drawing wherein there is disclosed a preferred embodiment of the invention.

Figure 1B:
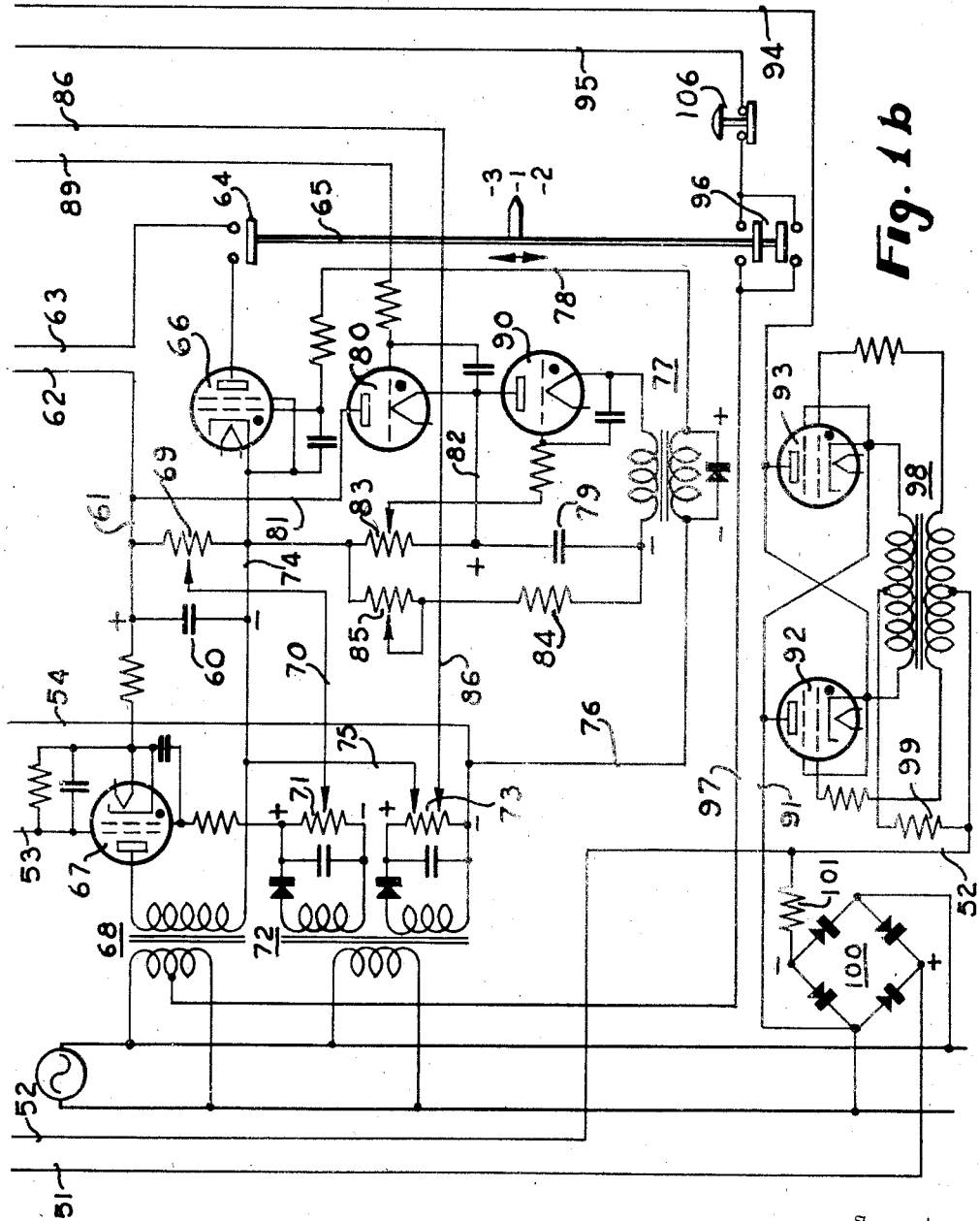

In the drawing:

Figures 1a and 1b are schematic representations of a roller spot welding machine constructed in accordance with the principles of the invention; and Figures 2, 3, 4 and 5 are current-force characteristic charts illustrating the various conditions under which the machine of Figures 1a and 1b may be operated.

In the drawing, reference numeral 10 indicates a rotatable electrode which is journaled for rotation about a normally fixed axis in or on the welding machine while the reference numeral 11 designates a second roller electrode which is rotatably carried by a slide 12. A housing 13, which may be integral with the principal frame of the welding machine, journals rollers 14 which provide an anti-friction guide for the slide 12 and encloses a force changing assembly, designated generally by reference numeral 15 which may be of the kind fully disclosed and claimed in the copending application of Hans H. Hansen Serial No. 530,829 filed April 13, 1944, now Patent Number 2,412,044, dated December 3, 1946. As shown, the device 15 consists of an outer member 16 which is mechanically connected to a piston 17 and to which is connected, in a fluid-tight manner, the outer peripheries of a diaphragm 17' and the inner periphery of a diaphragm 18. Piston 17 is contained within a cylinder 19 carried by the housing 13. Positioned within the outer member 16 of the pressure changing device 15 is an inner member 20 to which are connected, in a fluid-tight manner, the inner peripheries of the diaphragm 17' and the outer peripheries of the diaphragm 18. A saddle 21 mechanically connects the member 20 with the slide 12 so that the slide and consequently the electrode 11 moves and transmits force in response to movement and the application of force to the member 20.

Fluid under pressure, preferably air, is conducted into the space immediately above the diaphragm 17' by a conduit 22 communicating with a supply conduit 23 through a valve 24. Similar fluid under pressure is conducted into the space immediately above diaphragm 18 by conduit 25 communicating with conduit 22 through a valve 26 which may be either of the metering or of the combined check and metering type. Air under pressure is also supplied to the cylinder 19 above the piston 17 by conduit 27 under control of the valve 28. Upon opening of the valve 28 piston 17 is held in a downward position and the member 20 "floats" in the member 16, the flexibility being provided by the diaphragms 17' and 18. It should be apparent that with the parts in such relative positions the force applied to the electrode 11 is the resultant of the downward force exerted by the air pressure in the space immediately above the diaphragm 17' and the upward force exerted by the air pressure in the space immediately above the diaphragm 18. Since the effective area of the movable wall of the first mentioned space is greater than the effective area of the movable wall of the second mentioned space the resultant force will always be in a downward direction. To provide means to rapidly increase the welding force applied by the electrode 11 in an accurately timed manner I provide an outlet valve 29 in communication with the conduit 25 which is arranged to be operated (opened) by the energization of the solenoid 30. A similar outlet valve 31 in communication with the conduit 22 is arranged to be opened by the energization of a second solenoid 32. It should be apparent that if the passage through valve 26 is substantially smaller than the outlet port of valve 29 the opening of the latter valve quickly releases the pressure in the space above the diaphragm 18 thereby removing the opposing upward force exerted thereby to increase the welding force applied through electrode 11 by this amount.

Roller electrode 11 is arranged to be rotated in an intermittent manner by the gear wheel 33 of a Geneva drive mechanism the driving pawl 34 of which is arranged to be rotated normally at uniform speed by a drive shaft 35 acting through gears 36, 37 and 38. Intermediate gear 37 has twice the number of teeth of the gear 38 and is utilized to drive directly a commutator drum 39. Positioned circumferentially around the drum 39 and axially spaced thereon in the relative positions indicated in the development of Figure 1a are the current conductive segments 40, 41, 42, 43, 44 and 45. Cooperating with these segments in a manner to be more fully disclosed hereinafter are the current conducting brushes 46, 47, 48, 49 and 50 which are connected to conductors 51, 52, 53, 54 and 53, respectively. While the principles of the invention may be used with any type of welding current we have illustrated the same as being applied to a welding system of the capacitor discharging type wherein the advantageous features of the invention are of maximum benefit as in the roller spot welding of thin aluminum sheets, for example. Such a welding system may comprise a principal power capacitor 55 which is arranged to be charged by suitable means, not shown, and the energy of which is arranged to be discharged through the welding load in each cycle of operation through a welding transformer 56, preferably of the type having a center tap primary winding for discharging the capacitor through the primary winding in opposite directions in each succeeding cycle of operation. To control such discharge we may connect electric valves 57 and 58 between the end terminals of the primary winding of the transformer 56 and one terminal of capacitor 55 while the other terminal of the capacitor is connected to the center tap of the primary winding of transformer 56. Commutator 39 is operative through bars 42, 43, 44 and 45 to initiate conduction in valves 57 and 58 alternately in succeeding welding operations as more fully described in the co-pending application of Robert L. Ringer, Jr., and Clyde E. Smith, Serial No. 467,854, filed December 4, 1942.

In electric resistance spot welding with the use of double welding forces it is essential, if maximum benefit is to be obtained from the application of the second or higher force, that the second or higher force be consistently applied at accurately timed intervals following the initiation of flow of the welding current. Thus, it is highly desirable that solenoid 30 be energized upon the expiration of an accurately timed interval following the initiation of conduction in either of the valves 57 or 58. An operative circuit for accomplishing this function is illustrated in the drawing and will be now generally described. For a more detailed description of this timed energizing circuit reference is made to the co-pending application of M. A. Seeloff and C. E. Smith, Serial No. 482,630, filed April 10, 1943, now Patent Number 2,363,753, dated November 28, 1944. The present invention, however, provides in such energizing circuit a simplified and improved arrangement for blocking the charging rectifier for the solenoid (30) energizing capacitor to insure the release of the solenoid armature and the consequent building up of proper pressure in the space immediately above the diaphragm 18 intermediate each successive welding cycle.

Solenoid 30 is arranged to be energized by the discharge of a capacitance 60 through the circuit comprising conductors 61 and 62, solenoid 30, conductor 63, contactor 64 of a selector switch 65, and electric valve 66. Capacitance 60 is charged by a grid-controlled rectifier 67 which is supplied with current from a suitable alternating source through a transformer 68. Rectifier 67 is of the type having two control grids the principal one of which is in a control circuit including the adjustable tap of a potentiometer 69 connected across capacitance 60, conductor 70, and potentiometer 71 which furnishes an adjustable but normally fixed positive biasing potential for insuring conduction in tube 67. It should be apparent, however, that as the voltage rises across capacitance 60 potentiometer 69 operates to decrease conduction in tube 67 so that a control of the charge of capacitance 60 may be attained. The reference potential across potentiometer 71 is developed by a suitable rectifier deriving energy from the alternating current source through a transformer 72. This transformer and a second rectifier also develops a reference potential across potentiometer 73. Conductor 54 is connected to the negative terminal of potentiometer 73 while conductor 53 is connected to the second control grid of rectifier 67 so that upon establishment of an electrical interconnection between conductors 53 and 54 by the brushes 48—50 and the commutator segments 43, 45 the rectifier 67 will be blocked.

Electric valve 66 is preferably of the grid-controlled gas filled type and its control circuit may be traced from its cathode through conductors 74 and 75, a positive to negative portion of potentiometer 73, conductor 76, the secondary winding of an impulse transformer 77, and conductor 78 whereby it is normally held non-conducting. There is provided a timing circuit to furnish an electrical impulse to transformer 77 a predetermined interval following the initiation of welding current flow and in a direction to overcome the normal negative grid bias on the tube 66 as furnished by the potentiometer 73 to initiate conduction in the tube 66. Such timing circuit includes a capacitance 79 and a grid-controlled gaseous discharge device 80, the anode to the latter being connected to the positive terminal of capacitance 60 through conductor 61 and a conductor 81 while the cathode is connected to the negative terminal of capacitance 60 through a conductor 82 and resistance 83. In parallel with resistance 83 is the timing capacitor 79, a fixed resistance 84, and a potentiometer 85 in series so that upon conduction in tube 80 capacitance 79 is charged at a rate determined by the setting of potentiometer 85.

Conduction in tube 80 is initiated immediately upon initiation of flow of welding current by a control circuit which includes a positive to negative portion of potentiometer 73 to provide a normally fixed negative grid biasing potential, conductor 86, a resistance 87 which is shunted across the secondary of a current transformer 88 the primary of which is in series with the energizing circuits of the welding transformer 56, and conductor 89. The secondary winding of transformer 88 is so phased that the potential developed across resistance 87 is in opposition to the negative component pressed across conductors 75 and 86 by the potentiometer 73 so that the impulse resulting from the start of flow of welding current initiates conduction in tube 80.

The circuit for discharging timing capacitance 79 through the primary winding of transformer 77 upon this capacitance attaining a predetermined charge comprises the conductor 82, and grid-controlled discharge device 90 in series with the primary winding and the capacitance. The cathode of tube 90 is connected to the negative terminal of capacitance 60 through the primary winding of transformer 77, and resistances 84 and 85 while the control grid thereof is connected to the adjustable tap of the potentiometer 83. Thus the connection of the cathode is also to the negative terminal of the capacitance 79 and as the capacitance 79 attains a predetermined charge as determined by the setting of the potentiometer 83 the tube 90 begins to conduct to discharge the capacitance 79 through the primary winding of transformer 77. This induces an impulse in the secondary of transformer 77 in opposition to the negative biasing potential furnished by potentiometer 73 to initiate conduction in tube 66—assuming, of course, that the contactor 64 is closed. In this manner solenoid 30 can be energized in an accurately timed manner following the initiation of the flow of welding current. As explained in the above mentioned co-pending application Serial No. 482,630 the electrical and mechanical parameters and factors of the solenoid 30 and its energizing circuit and connected valve may be such as to insure the full opening of the valve in a consistently timed manner in each cycle of operation.

A controlled energizing circuit for the solenoid 32 is provided comprising a conductor 91 leading from one of the terminals of the alternating current source, a pair of grid-controlled gas filled valves 92 and 93 connected in inverse parallel, conductor 94, solenoid 32, conductor 95, switch 96, and conductor 97 which leads back to the source through a center tap provided on the primary winding of the transformer 68. The effect of this center tap connection is, of course, to reduce the voltage which is applied to the solenoid 32. Switch 96 is a part of the selector switch 65 and is closed when selector switch 65 is moved either to position #2 or position #3 as indicated on the drawing. The control electrodes of valves 92 and 93 are connected, through suitable current limiting resistors, to the end terminals of a center-tapped secondary winding of a grid transformer 98, the primary winding of which is center tapped and has its end terminals connected respectively with the cathodes of the valves 92 and 93. The center taps of the primary and secondary windings of the transformer 98 are interconnected through a resistance 99. As is well understood in the art, this circuit arrangement will result in conduction in valves 92 and 93 during the successive half cycles of the alternating current source in which the anodes are positive with respect to the cathodes in the respective valves. Means, however, is provided to hold off conduction in the valves 92 and 93 which means comprises a full wave rectifier 100, preferably of the dry disk type, which is supplied with alternating current directly from the source. The negative terminal of the output of the rectifier 100 is connected to the conductor 52 through a resistance 101 and, as shown, conductor 52 is, in turn, connected to the center tap of the secondary winding of the grid transformer 98. The negative potential thus furnished by the rectifier 100 and impressed on the control grids of the valves 92 and 93 through the sections of the secondary winding of the transformer 98 is sufficient to withhold conduction in the valves 92 and 93. To remove this withholding potential to allow valves 92 and 93 to conduct when desired the conductor 51 is connected to the positive terminal of the output of the rectifier 100 and upon the electrical interconnection of the conductors 51 and 52 by engagement of the brushes 46 and 47 with either of the commutator segments 40 and 41 the positive potential of the output of rectifier 100 appears in conductor 52 and consequently at the control grids of the valves 92 and 93 causing these valves to conduct during the respective half cycles of the alternating current source.

In operation, with the selector switch 65 moved to position #3 and welding power capacitor 55 and solenoid energizing capacitance 60 being fully charged, the rotation of the driving shaft 35 will automatically result in the following sequence of operations—assuming that fluid pressure is available in valves 24 and 28 and that work pieces to be welded are entered between electrodes 10 and 11. The pressure in conduit 27 will have "bottomed" the piston 17 so that the initial welding force is, as explained above, the resultant of the two opposing forces exerted by the fluid pressures above the diaphragms 17' and 18, respectively. This is the condition of the parts immediately after the driving pawl 34 has cleared one of the teeth of the Geneva gear 33, i. e. upon the pawl reaching an angular position represented by mark A in Figure 1a. When the pawl advances to position B one or the other of the commutator segments 43, 45 reaches appropriate brushes to initiate conduction in one or the other of the valves 57, 58 to initiate the flow of welding current through the work. It should be observed that after the pawl passes point A the roller electrodes are held stationary by the operation of the Geneva gear. Solenoids 30 and 32 are, of course, de-energized at the start of flow of the welding current but by operation of the timed energizing circuit described above, solenoid 30 is energized at a predetermined time following such initiation of flow of welding current. This is accomplished by first "tripping" the start tube 89 by the initial impulse furnished by transformer 88 and the subsequent firing of tubes 90 and 66 in sequence. At a time represented by the point C (Figure 1a) the valve 29 may reach a fully opened condition and thereafter a higher welding force, caused by the withdrawal of the opposing fluid pressure from above the diaphragm 18, is maintained. At a later time when pawl 34 reaches angular position D the commutator 39 will have advanced approximately 90° bridging the brushes 46 and 47 by means of the segment 40. This shorts the conductors 51 and 52 and removes the negative blocking potential applied to the control electrodes of valves 92 and 93 thereby allowing these valves to conduct to energize solenoid 32 and open valve 31 which action removes all fluid pressure from the force exerting member 15 and releases substantially all the force applied to electrode 11. However, the weight of the assembly 15, slide 12, wheel 11 and its mount, etc. is sufficient to hold the work clamped and to move the work upon rotation of the electrode 11. Upon further rotation of the pawl 34 to position E the brushes 48—50 make contact with one or the other of the segments 43—45 to momentarily block rectifier 67 to release solenoid 30 and de-ionize tube 66 thereby recycling this circuit for the next succeeding cycle of operation. Due to the substantial circumferential extent of the segments 40 and 41 solenoid 32 will be held energized during the time the pawl 34 is advancing gear 33 so that during the indexing rolling movement of the stock between the electrodes no substantial force is exerted on the stock by the electrodes. Upon completion of the indexing movement, at which time pawl 34 reaches point A, segments 40, 41 disengage brushes 46 and 47 and solenoid 32 is de-energized to allow the spring to close valve 31 allowing pressure to build up in the assembly 15. It should be observed that the time interval represented by the angular distance from point A to point B is sufficient to enable the proper initial welding force to be obtained before the flow of welding current is initiated.

Figure 5:
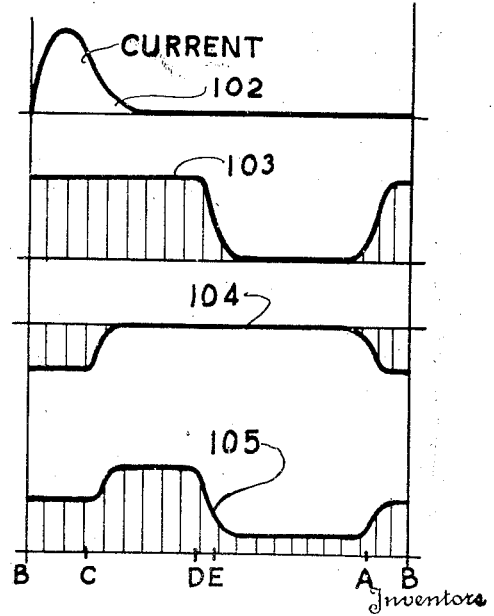

The above described operation of the apparatus is further explained by the chart of Figure 5 wherein curve 102 represents the flow of welding current, curve 103 the downward pressure exerted by the fluid in the space above diaphragm 17', curve 104 the opposing pressure exerted by the fluid in the space above diaphragm 18, and curve 105 the net resultant downward force exerted through the electrode 11.

Figure 2:
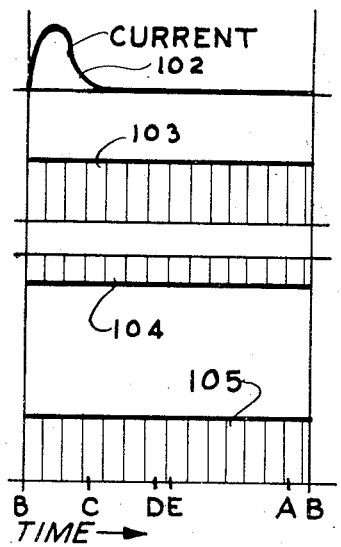
Figure 3:
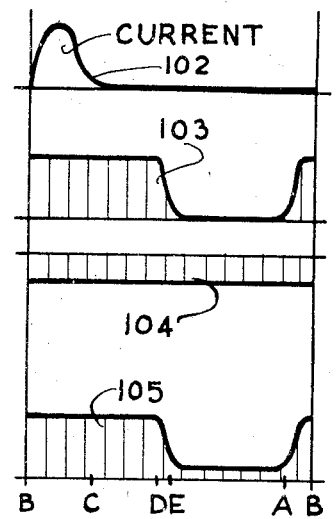
Figure 4:
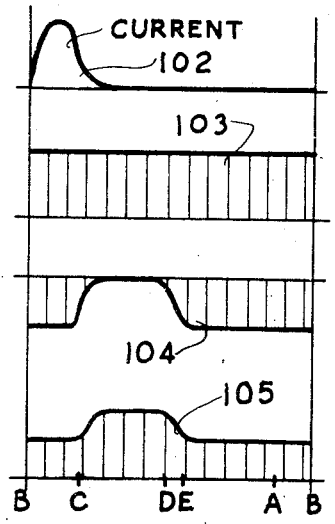

Figures 2, 3 and 4 illustrate other operating conditions which may be obtained by the apparatus described above. Figure 2 illustrates the conditions resulting from the positioning of selector 65 in position #1 during the welding cycle. In this mode of operation there is no change in the welding force or in the clamping force exerted by the electrodes in any part of the complete cycle of operation. In Figure 3 there is no change, during the cycle, in the opposing force exerted above the diaphragm 18 but the downward force exerted above the diaphragm 17' is removed during the indexing movement of the electrodes by energization of solenoid 32 and, thus, Figure 3 represents the mode of operation which is obtained by moving selector switch 65 to position #2. In Figure 4 there is no change in the downward force component but the opposing or upward force component is removed during the welding cycle and this mode of operation may be accomplished by moving selector switch 65 to position #3 and interrupting the circuit to the solenoid 35 as by means of a manual switch 106, for example.

It should be understood that, in accordance with usual practice, the brushes which engage the commutator segments are readily adjustable circumferentially of the commutator so that necessary and desirable adjustments in the timing of the sequences may be readily accomplished to insure optimum operation of the system particularly at high speeds of production. Thus, for example, the brushes 48—50 may be shifted to effect the release of solenoid 30 and the consequent closing of valve 29 in the expiration of a lesser interval following the initiation of flow of the welding current as indicated in Figure 4.

It should now be apparent that we have provided an improved electric resistance welding system of the roller spot type which accomplishes the objects initially set out. The various features of the invention make it possible to effect a series of spot welds along work pieces to be welded together in a rapid and expeditious manner notwithstanding the practical requirements as to the use of varying welding force in connection with the making of each weld and the practical requirements of providing machines which are rugged and durable in service and of avoiding unnecessary or excessive marking of the work pieces. The above specifically described embodiment of our invention should, however, be considered as merely illustrative as obviously many changes may be made therein without departing from the spirit or scope of the invention. Reference should therefore be had to the appended claims in determining the scope of the invention.

What we claim is:

1. In electric resistance welding apparatus having a roller electrode, means to effect intermittent rolling movement of said electrode with respect to the work being welded, means to conduct welding current to said electrode at times intermediate the periods of said relative movement, and means operable synchronously with said intermittent movement effecting means to apply welding force to said electrode during said times and to remove said force during said rolling movement.

2. In electric resistance welding apparatus having a roller electrode, means to apply welding force therethrough including means to vary the value of said force both above and below an initial welding force, means to effect intermittent rolling movement of said electrode with respect to the work being welded, means operable synchronously with said means to effect to initiate conduction of welding current to said electrode and to actuate said force varying means to reduce said force below said initial welding force, and timing means to actuate said force varying means to increase said force above said initial welding force upon the expiration of a predetermined time interval following the initiation of flow of welding current.

3. In electric resistance welding apparatus having a roller electrode, means to apply welding force therethrough including means to increase the value of said force above an initial welding force, means to effect intermittent rolling movement of said electrode with respect to the work being welded, means to conduct welding current to said electrodes, means operable synchronously with said means to effect to initiate conduction of welding current to said electrode, and timing means to actuate said force increasing means to increase the welding force upon the expiration of a predetermined time interval following the initiation of flow of welding current.

4. In electric resistance welding apparatus having a roller electrode for the transmission of welding current and welding force, means to conduct welding current to said electrode including means to initiate the flow of said welding current, means to rotate said electrode intermittently comprising a Geneva gear having a driving pawl, and means operable synchronously with said driving pawl to actuate said current flow initiating means whereby the welding current is caused to flow during periods of time when said electrode is at rest.

5. In electric resistance welding apparatus having a roller electrode for the transmission of welding current and welding force, means to effect intermittent rolling movement of said electrode with respect to the work being welded, means to conduct welding current to said electrode including means to initiate the flow of said welding current, a welding force controlling device comprising a movable member for rotatably supporting said electrode, means to apply a force to said member in a direction tending to increase the welding force, means to apply a lesser force to said member in the opposite direction, means operable synchronously with said means to effect to actuate said current flow initiating means during periods when said electrode is at rest, and time controlled means to remove said lesser force at predetermined times following the initiation of welding current flow in the respective cycles of operation.

6. In electric resistance welding apparatus having a roller electrode and means to effect intermittent rolling movement of said electrode with respect to the work being welded, the combination of means to conduct welding current to said electrode during successive periods of rest of said electrodes, a welding force controlling device having a movable member rotatably supporting said electrode, means to apply a first force to said member in a direction tending to increase the welding force, means to apply a lesser force to said member in the opposite direction, means to withdraw said lesser force during the periods when said electrode is at rest, and means operable synchronously with said means to effect to withdraw said first force during periods of movement of said electrode.

7. In electric resistance welding apparatus having a roller electrode and means to effect intermittent rolling movement of said electrode with respect to the work being welded, means to conduct welding current to said electrode at times intermediate the periods of movement of said electrode, means to apply an initial welding force to said electrode during said times, means comprising an electromagnetic device to increase said initial welding force during the welding cycles, means to energize said device comprising a capacitor and a rectifier for charging said capacitor, and means operable synchronously with said means to effect to momentarily block said rectifier upon completion of each welding cycle.

8. In electric resistance welding apparatus having a roller electrode and means to effect intermittent rolling movement of said electrode with respect to the work being welded, the combination of means to apply an initial welding force to said electrode at times intermediate the periods of indexing movement of said electrode, means to increase said initial force during said times comprising an electromagnetic device, means to energize said device comprising a capacitor and a rectifier for charging said capacitor, and means to momentarily block said rectifier substantially at the completion of the respective welding cycles.

9. In electric resistance welding apparatus having a roller electrode for the transmission of welding current and welding force, means to effect intermittent rolling movement of said electrode with respect to the work being welded, a movable member supporting said roller electrode and constituting a movable common wall for a pair of contiguous fluid pressure operated flexible bellows, a housing constituting the outer walls of said bellows, means to move said housing in a direction tending to move said electrode into engagement with the work being welded to a predetermined position, and means to conduct fluid under pressure to the respective bellows whereby the welding force exerted by said electrode may be predetermined and maintained while said electrode is in engagement with the work and said housing remains in said predetermined position.

10. Apparatus according to claim 9 further including means operable synchronously with said means to effect to release the fluid pressure in the bellows on the side of said common wall opposite said electrode whereby the force exerted by said electrode on the work may be substantially diminished during indexing movement of said electrode.

11. Apparatus according to claim 9 further including means operable synchronously with said means to effect to initiate the flow of welding current to said electrode at times intermediate the periods of indexing movement of the electrode, and means to release the pressure in the bellows intermediate said common wall and said electrode at a predetermined time following the initiation of flow of the welding current in the respective cycles of operation whereby the welding force may be increased during the respective welding cycles.

12. An electric resistance welding machine having a roller electrode for the transmission of welding current and welding force to the work to be welded, a drive shaft, means to rotate said drive shaft at substantially uniform speed during operation of the machine, discontinuous coupling means between said shaft and said electrode whereby said electrode is rotated in an intermittent manner, means to initiate the flow of welding current to said electrode at times intermediate the periods of indexing movement of said electrode, means to apply welding force to said electrode, means to reduce the force applied to said electrode substantially below the welding force, and control means driven by said shaft to initiate operation of said means to reduce.

13. An electric resistance welding machine having a roller electrode for the transmission of welding current and welding force to the work to be welded, a drive shaft, means to rotate said drive shaft at substantially uniform speed during operation of the machine, discontinuous coupling means between said shaft and said electrode whereby said electrode is rotated in an intermittent manner, means to initiate the flow of welding current to said electrode at times intermediate the periods of indexing movement of said electrode, means to apply welding force to said electrode, said means to initiate the flow of welding current comprising a commutator and a driving connection between said shaft and commutator, electrically controlled means to decrease the force applied to said electrode substantially below the welding force, and means including said commutator to initiate operation of said means to decrease.

14. An electric resistance welding machine having a roller electrode for the transmission of welding current and welding force to the work to be welded, a drive shaft, means to rotate said drive shaft at substantially uniform speed during operation of the machine, discontinuous coupling means between said shaft and said electrode whereby said electrode is rotated in an intermittent manner, means to initiate the flow of welding current to said electrode at times intermediate the periods of indexing movement of said electrode, means to apply welding force to said electrode, said means to initiate comprising a commutator driven by said shaft, means to increase the welding force applied to said electrode, timing means to actuate said means to increase upon the expiration of a predetermined time interval following the initiation of flow of welding current, and electrically operated means including said commutator to restore the force applied to said electrode to its initial value preparatory to the next succeeding cycle of operation.

15. In electric resistance welding apparatus, a welding electrode, means to apply welding force to said electrode, electromagnetically operated means for changing the value of said welding force, means comprising a commutator to initiate the flow of welding current to said electrode, means to energize said electromagnetically operated means comprising a capacitor and a charging rectifier therefor, and means comprising said commutator to momentarily block said rectifier substantially at the time of completion of the welding cycle.

HANS H. HANSEN.
CLYDE E. SMITH.

REFERENCES CITED

The following references are of record in the file of this patent:

UNITED STATES PATENTS

| Number | Name | Date |
|---|---|---|
| 1,554,273 | Gibb | Sept. 22, 1925 |
| 1,640,244 | McBerty | Aug. 23, 1927 |
| 2,249,488 | Nickle | July 15, 1941 |
| 2,331,537 | Clark | Oct. 12, 1943 |